US012652624B2

(12) United States Patent
Abid et al.

(10) Patent No.: US 12,652,624 B2
(45) Date of Patent: Jun. 9, 2026

(54) METHOD FOR COMMANDING THE TRANSMISSION OF SELF-ADAPTIVE RADIO SIGNALS

(71) Applicant: SAGEMCOM ENERGY & TELECOM SAS, Bois-Colombes (FR)

(72) Inventors: Oussama Abid, Bois-Colombes (FR); Abbas Sabraoui, Bois-Colombes (FR); Ahmet Samed Basturk, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/529,825

(22) Filed: Dec. 5, 2023

(65) Prior Publication Data

US 2024/0188003 A1 Jun. 6, 2024

(30) Foreign Application Priority Data

Dec. 6, 2022 (FR) ..................................... 2212828

(51) Int. Cl.
*H04W 52/36* (2009.01)
*H04L 5/00* (2006.01)
(Continued)

(52) U.S. Cl.
CPC ........... *H04W 52/36* (2013.01); *H04L 5/0044* (2013.01); *H04L 67/12* (2013.01); *H04W 72/0473* (2013.01)

(58) Field of Classification Search
None
See application file for complete search history.

(56) References Cited

U.S. PATENT DOCUMENTS 6,023,475 A 2/2000 Tanaka et al.
7,042,901 B1 * 5/2006 Hann ................... H04L 12/2854
370/463

(Continued)

FOREIGN PATENT DOCUMENTS

CN 1618054 A 5/2005
CN 101523752 A 9/2009
(Continued)

OTHER PUBLICATIONS

Search Report Issued in FR 2212828, dated Jun. 12, 2023.
(Continued)

*Primary Examiner* — Nguyen H Ngo
(74) *Attorney, Agent, or Firm* — Birch, Stewart, Kolasch & Birch, LLP

(57) ABSTRACT

A method including the steps of: causing to transmit a first radio signal carrying payload data, such that the time interval separating the transmission of the first radio signal and the transmission of a preceding signal is equal to a period (Pt) stored by the transmitter, the first radio signal carries a first frame of the payload data having a size equal to a size (Tt) stored by the transmitter; an estimate of a quantity of energy consumed by the transmitter to transmit the first radio signal; a comparison between the consumed quantity of energy and a reference quantity of energy; an update of the stored period (Pt) and/or of the stored size (Tt) on the condition that a difference between the estimated quantity of energy and the reference quantity of energy is greater than a previously defined threshold.

7 Claims, 2 Drawing Sheets

(51) Int. Cl.
    *H04L 67/12*        (2022.01)
    *H04W 72/044*    (2023.01)

(56)           References Cited

U.S. PATENT DOCUMENTS

| | | | |
|---|---|---|---|
| 2005/0018638 A1* | 1/2005 | Lindskog .......... | H04W 52/0296 |
| | | | 370/338 |
| 2006/0270385 A1* | 11/2006 | Morris ................ | H04B 17/318 |
| | | | 455/405 |
| 2016/0249290 A1* | 8/2016 | Ambapuram ..... | H04W 52/0229 |
| 2019/0053258 A1* | 2/2019 | Zhang .................. | H04L 5/0055 |
| 2021/0185543 A1* | 6/2021 | Xu ........................ | H04L 5/0048 |

FOREIGN PATENT DOCUMENTS

| | | | |
|---|---|---|---|
| GB | 2 386 507 A | 9/2003 |
| JP | 2007-53589 A | 3/2007 |

OTHER PUBLICATIONS

Chinese Office Action and Search Report for Chinese Application No. 202311661849.9, dated Dec. 3, 2025, with English translation.

\* cited by examiner

[Fig. 1]
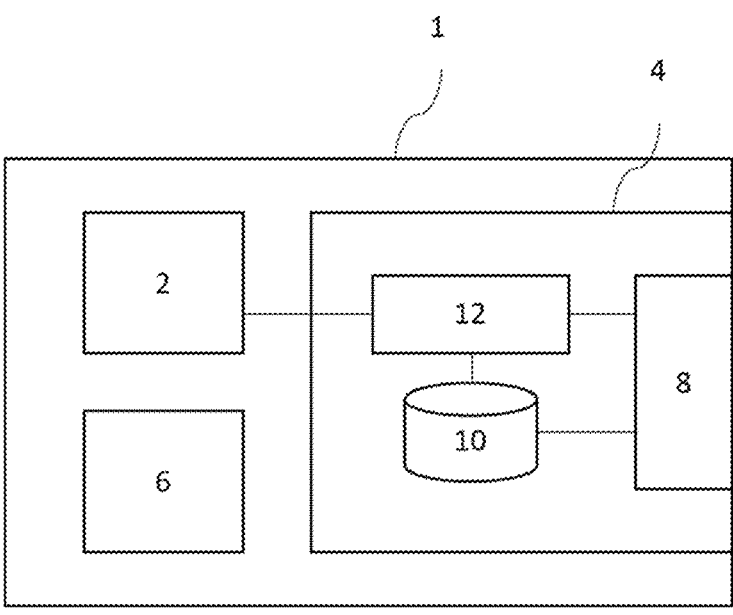
[Fig. 2]
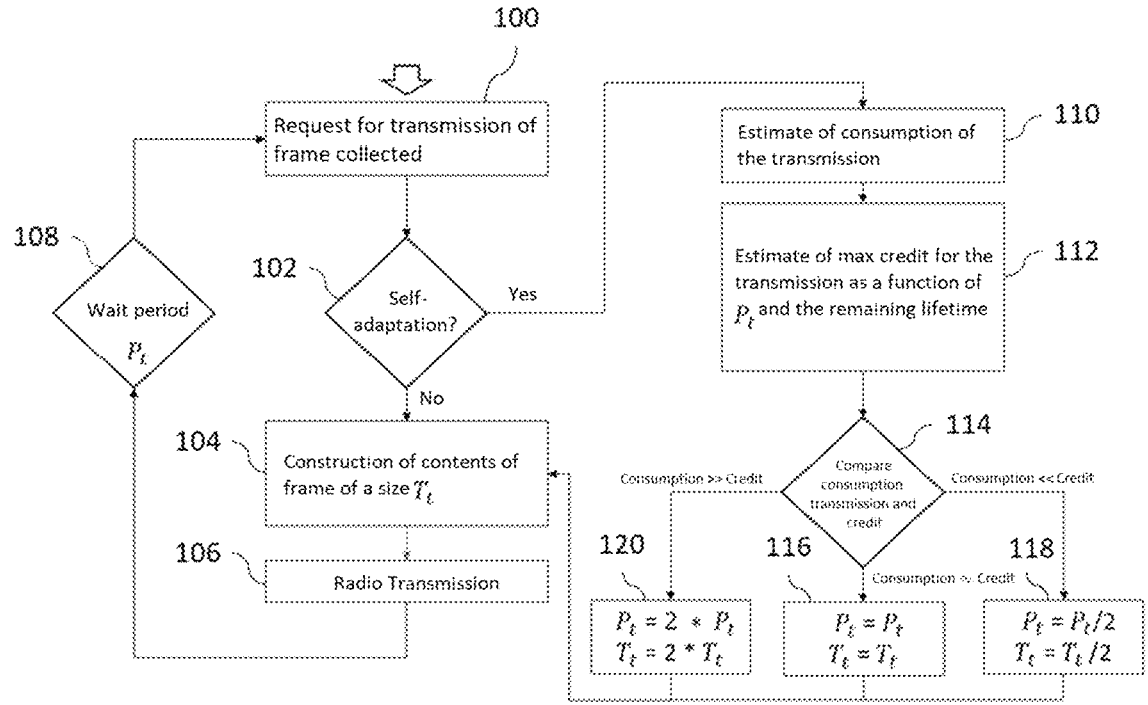

[Fig. 3]
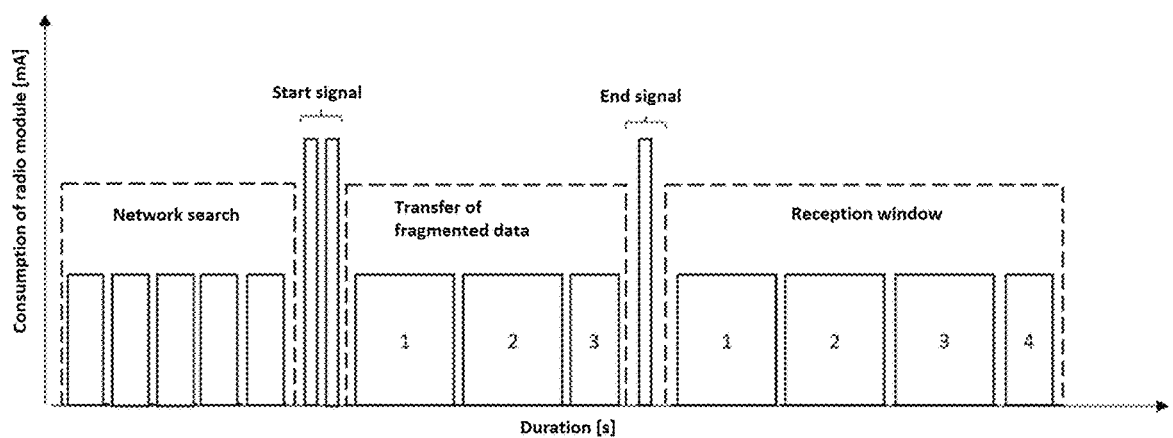

1

METHOD FOR COMMANDING THE TRANSMISSION OF SELF-ADAPTIVE RADIO SIGNALS

CROSS REFERENCE TO RELATED APPLICATIONS

The benefit of priority to French Patent Application No. 2212828 filed Dec. 6, 2022, is hereby claimed and the disclosure is incorporated herein by reference in its entirety.

FIELD OF THE INVENTION

This invention relates to a method for transmitting radio signals carrying payload data.

BACKGROUND OF THE INVENTION

Devices are known from the prior art intended to periodically transmit payload data to a remote equipment item, such as water meters.

Some of these devices are supplied with energy by a battery storing a limited quantity of energy. Each time a signal carrying payload data is transmitted by such a device, energy is consumed in the battery. When the battery is empty, the device can no longer operate, and, in particular, can no longer send payload data.

Note that the quantity of energy consumed to transmit a signal carrying payload data varies according to the place of installation of the device. Specifically, the network coverage of the device depends on the place of installation. For example, if the network coverage is poor, the device may be required to consume extra energy by repeating the sending of fragments or by increasing the transmission power.

Consequently, the respective batteries of two identical devices placed in different places may empty at different speeds. Consequently, the effective lifetimes of these devices can sometimes be very different, which is undesirable.

SUMMARY OF THE INVENTION

One aim of the invention is to remedy this situation.

For this effect provision is made, according to a first aspect, for a method comprising the following steps implemented by a transmitter:

causing to transmit a first radio signal carrying payload data, such that:

the time interval separating the transmission of the first radio signal and the transmission of a preceding radio signal by the transmitter is equal to a period stored by the transmitter, the first radio signal carries a first frame of the payload data having a size equal to a size stored by the transmitter, estimating a quantity of energy consumed by the transmitter to transmit the first radio signal, a comparison between the consumed quantity of energy and a reference quantity of energy, an update of the stored period and/or of the stored size on the condition that a difference between the estimated quantity of energy and the reference quantity of energy is greater than a previously defined threshold,

after the update, causing to transmit a second radio signal carrying payload data, such that:

the time interval separating the transmission of the second radio signal and the transmission of the first radio signal by the transmitter 4 is equal to the stored period, the second radio signal carries a second frame of the payload data having a size equal to the stored size.

The method according to the first aspect can also comprise the following features, taken alone or in combination when this is technically possible.

Preferably, the update comprises a reduction of the stored period and/or a reduction of the stored size, when the difference is greater than the threshold and when the estimated consumed quantity of energy is less than the reference quantity of energy. Preferably, the stored period is reduced by a first factor, and the stored size is reduced by the first factor.

Preferably, the update comprises an increase in the stored period and/or an increase in the stored size, when the difference is greater than the threshold and when the estimated quantity of energy is greater than the reference quantity of energy. Preferably, the stored period is increased by a second factor, and the stored size is increased by the second factor.

Preferably, the first factor and the second coefficient are equal.

Preferably, the method according to the first aspect further comprises a step of computation of the reference quantity of energy based on the stored period and on a remaining quantity of energy in a battery 6 of the transmitter.

Preferably, the quantity of energy consumed to transmit the first radio signal is estimated based on a duration of transmission of the first signal and on a transmission power of the first signal.

Preferably, the payload data comprise at least one measurement of consumption of a fluid.

Provision is also made, according to a second aspect, for a computer program product comprising program code instructions for the execution of the steps of the method according to the first aspect, when this program is executed by a transmitter.

Provision is also made, according to a third aspect, for a memory readable by a computer storing instructions executable by the computer for the execution of the steps of the method according to the first aspect.

Provision is also made, according to a fourth aspect, for a transmitter comprising a radio communication interface, and a control unit configured to implement the steps of the method according to the first aspect, such that the first radio signal and the second radio signal are transmitted by the radio communication interface.

Provision is also made, according to a fifth aspect, for a meter for measuring the consumption of fluid, the meter comprising a transmitter according to the fourth aspect.

BRIEF DESCRIPTION OF THE DRAWINGS

Other features, aims and advantages of the invention will become apparent from the following description, which is purely illustrative and non-limiting, and which must be read with reference to the appended drawings wherein:

FIG. 1 schematically illustrates a device according to an embodiment.

FIG. 2 is a flow chart of steps of a method according to an embodiment.

FIG. 3 shows the variation in a quantity of energy consumed to transmit a radio signal over time.

In all the figures, similar elements bear identical references.

DETAILED DESCRIPTION OF THE INVENTION

FIG. 1 shows a device 1. The device 1 is for example a meter having the general function of measuring the consumption of fluid, for example the consumption of water in an installation.

The device 1 comprises a sensor 2, a transmitter 4 and a battery 6.

The sensor 2 is configured to acquire measurements indicative of the consumption of fluid in the installation.

The transmitter 4 is configured to transmit radio signals repeatedly over time in a network, such that these radio signals are received by a remote equipment item.

The network under consideration is typically a Low Power Wide Area Network or LPWAN. For example, the LPWAN network is one of the following: SigFox, LoRaWAN, NB-IOT, CAT-M, WAZE, or wMBUS.

The battery 6 constitutes an energy source used to supply energy to the other components of the device 1, in particular the transmitter 4. The battery 6 stores a limited quantity of energy: this stored quantity of energy decreases over time, particularly each time the transmitter 4 transmits a radio signal. The battery 6 can be rechargeable or not. The battery 6 for example comprises one or more electric cells.

The transmitter 4 comprises a radio communication interface 8, a memory 10 and a control unit 12.

The radio communication interface 8 is suitable for generating the aforementioned radio signals. The radio communication interface 8 comprises one or more antennas.

The memory 10 stores two parameters: a transmission period Pt and a frame size Tt. Further on it will be seen that these two parameters respectively influence the transmission times and the lengths of the radio signals transmitted by the transmitter 4.

The control unit 12 is configured to control the transmission of radio signals by the radio communication interface 8, such as to take into account both the aforementioned parameters. In particular, the control unit 12 is capable of modifying the values of the two parameters Pt, Tt which are stored in the memory 10.

The control unit 12 is further configured to generate frames of payload data intended to be communicated to a remote equipment item. The generated frames typically comprise measurements provided by the sensor, or data which come from the sensor.

The control unit 12 may comprise one or more processors, programmable (FPGA for example) or not (ASIC). The or each program can be adapted to execute a control program comprising code instructions for the implementation of a method that will be described further on. The control program is for example stored in the memory 10.

In general, the transmitter 4 is configurable in two operating modes which will be detailed in the remainder of the text: a static operating mode and a dynamic operating mode. The operating mode in which the transmitter 4 is configured is for example indicated in a datum stored in the memory 10, for example a Boolean. The transmitter 4 may change operating mode, typically on receiving a request to this effect received via the radio communication interface 8, and previously transmitted by a remote equipment item.

With reference to FIG. 2, a method implemented by the transmitter 4 comprises the following steps.

In a step 100, the control unit 12 detects that a radio signal is to be transmitted. It will be seen further on that this detection is based on an elapsed time interval.

In a step 102, the control unit 12 determines the operating mode in which the transmitter 4 is configured (static or dynamic). According to the determined mode, different steps are implemented by the control unit 12.

Static Operating Mode

When the operating mode of the transmitter 4 is the static mode, the control unit 12 constructs a frame containing payload data (step 104). The control unit 12 imposes a constraint that the constructed frame has a size equal to the frame size Tt as stored in the memory 10.

Next, the radio communication interface 8 transmits a radio signal carrying the constructed frame. The radio signal is a time-domain signal of limited duration. The signal transmission begins at one time, and stops at a later time, the interval between these two times constituting the duration of the transmitted radio signal. This duration depends on the size of the constructed frame.

FIG. 3 schematically represents the variation in the quantity of energy consumed by the transmitter 4 to transmit the radio signal in step 106 over an LPWAN network. Thus, several phases can be distinguished:

a network search phase: This phase is dominant in so-called connective networks (i.e. with signals exchanged between the transmitter 4 and remote recipient equipment items such as gateways. Its duration can range from a few seconds to several minutes according to the frequency bands that the search must cover. This phase makes it possible to:

determine a listening frequency of the remote equipment item or items;

initiate a dedicated channel configuration for the transmitter 4 attach itself to the network.

a signaling phase: This phase makes it possible to give an alert about the start or end of a transmission phase.

Data transfer: According to the protocol layers involved, encapsulation and fragmentation mechanism are applied. The payload data are transmitted in this phase.

Reception window: According to the network, one or more reception windows activate after a transmission of payload data.

It should be noted that the phases forming the transmission session, their durations, frequencies and energy impacts vary from one technology to another overall, but they are generally present. For example, in a NBIOT network, the network search phase and the transmission durations are longer than in a CAT-M network because the modulation of the latter allows higher bitrates. Moreover, LoRa and SigFox networks have a very low bitrate compared to other technologies, which lengthens the transmission durations.

Returning to FIG. 2, the transmitter 4 then starts to wait for a period equal to the period stored in the memory 10 (step 108). In practical terms, the control unit 12 starts a time counter at the time at which the communication interface has begun to transmit the radio signal, and waits. When the time counter reaches a value equal to the period stored in the memory 10, the wait period is finished, and the method returns to step 100.

Finally, it is detected that a new frame is to be transmitted in step 100 when a time interval has elapsed equal to the period Tt counting from the time when a previous radio signal was transmitted (more precisely, the time at which this transmission started).

Based on the assumption that the operating mode of the transmitter 4 has not changed (static mode), a new radio signal is then transmitted during a new implementation of step 104. Using the preceding mechanism, the control unit 104 makes it so that:

the time interval separating the respective transmissions of two consecutive radio signals is equal to the period Pt stored by the transmitter 4, the two consecutive radio signals carry respective frames having sizes equal to the frame size Tt stored by the transmitter 4.

The preceding steps are repeated over time.

Thus, as long as the transmitter 4 is in the static operating mode, the transmitter 4 emits radio signals periodically, based on the period Pt stored in the memory 10. Moreover, all the signals carry the same quantity of payload data, this quantity being dictated by the stored frame size.

Dynamic Operating Mode

There will now follow a description of the steps implemented by the transmitter 4 when the control unit 12 observes in the step 102 that the operating mode in which the transmitter 4 has been configured is the dynamic mode. It will be seen that in the dynamic mode, a self-adaptation is implemented by the transmitter.

It is assumed that the transmitter 4 has already transmitted at least one radio signal in the past. By convention, it is considered that the last transmitted radio signal is a radio signal of index k−1, and that the frame carried by this signal is a frame of index k−1.

In a step 110, the control unit 12 estimates a quantity of energy consumed by the transmitter 4 to transmit the radio signal of index k−1. This estimate 110 can be made in different ways.

In a first embodiment, this estimate 110 is made based on the duration of the signal of index k−1 and the transmission power of the radio signal of index k−1.

The duration of the radio signal of index k−1 can be computed as follows:

$$\text{Number of fragments} =$$

$$\text{Number of repetitions} * \text{Rounded}_{up}\left[\frac{\text{Payload size}_{octets}}{\text{Fragment size}_{octets}}\right]$$

$$\text{Fragment transmission duration} =$$

$$\text{Number of fragments} * \left(\frac{\text{Fragment size}_{octets}}{\text{Bitrate}_{octets/s}}\right)$$

$$\text{Number of signals} = \text{signal}_{start} +$$

$$(\text{Number of fragments} * \text{Number of signals per fragment}) + \text{signal}_{end}$$

$$\text{Total transmission duration} =$$

$$\text{Number of retransmissions} * [\text{Attached duration} +$$

$$(\text{Number of fragments} * \text{Fragment transmission duration}) +$$

$$(\text{Number of signals} * \text{Signal duration}])$$

Where:

Number of repetitions is a number of times a fragment is transmitted (parameter depends on the network configuration)

Payload size$_{octets}$ is the size of the payload data carried by the radio signal of index k−1 (this parameter corresponds to the size Tt previously discussed), Fragment size$_{octets}$ is the size of a bottom layer (MAC) packet, Bitrate$_{octets/s}$ is a transmission bitrate which depends on the signal quality, modulation etc.

Number of signals is a number of signal messages,

Signal duration is an approximate value retrieved from the radio module,

Number of fragments is the number of fragments to be transmitted,

Fragment transmission duration is the average duration of transmission of a fragment.

The transmission power of the signal of index k−1 is measured by the transmitter 4.

The control unit 12 can estimate in step 110 a consumed current intensity based on the transmission power of the radio signal of index k−1. This estimate can be made based on a conversion table stored in the memory 10, this table associating power values, for example expressed in dBm, with current intensity values, for example expressed in milliamperes (mA).

The table 1 below is an example of a usable conversion table:

| Power (dBm) | Current |
|---|---|
| 0 | 30 mA |
| 1 | 32 mA |
| 2 | 35 mA |
| 3 | 40 mA |
| 4 | 52 mA |
| . . . | |
| 18 | 120 mA |
| 19 | 140 mA |
| 20 | 160 mA |

Next, the control unit 12 can estimate the consumed quantity of energy by multiplying the current intensity determined by the duration of transmission of the radio signal of index k−1. In this case, the estimated consumed quantity of energy can be expressed in mAh.

In a second embodiment, the estimate of step 110 is made based on actual current measurements acquired by an appropriate apparatus. The estimate could be more accurate than with the first embodiment, but the incorporation of the apparatus represents an extra manufacturing cost.

In a step 112, the control unit 12 obtains a reference quantity of energy. This step can be carried out in different ways.

In a first embodiment, the reference quantity of energy is a quantity determined in advance and stored in the memory 10. This quantity is determined according to a desired lifetime for the transmitter 4, and the maximum quantity of energy that can be stored in the battery 6.

In a second embodiment, the reference quantity of energy is computed by the control unit 12, particularly based on the period stored in the memory 10. Further on it will be seen that, in the dynamic operating mode, the stored period can vary over time; this also causes a variation in the reference quantity of energy over time.

More precisely, the reference quantity of energy can be computed as follows $$\text{Credit}_{mAh} = \frac{\text{Capacity}_{mAh}}{\text{Lifetime}_{days} * \text{Number of tramsissions}_{/day}}$$

where:

Capacity$_{mah}$ denotes a remaining quantity of energy in the battery 6,

Lifetime$_{days}$ and the remaining number of days for which the transmitter 4 is intended to operate before the battery 6 is empty, Number of transmissions$_{/day}$ is the number of signals to be transmitted per day (applying the stored period).

The reference quantity of energy thus represents a maximum quantity allocatable for the transmission of a signal so that the battery can operate for the stated number of days.

In a step 114, the control unit 12 compares the quantity of energy consumed to transmit the radio signal k−1, which was estimated in step 110, and the reference quantity of energy obtained in step 112. It will be seen that the control unit 12 will decide whether or not to update the parameters Pt, Tt stored in the memory 10 (frame size and/or transmission period) according to the comparison.

The control unit 12 computes a difference between these two quantity of energies. The threshold is in absolute value. The control unit 12 compares the difference with a previously defined threshold. This threshold is preferably strictly greater than zero.

When the difference is less than the threshold, then the parameters stored in the memory 10 (frame size and transmission period) are not modified (step 116).

When the difference is greater than or equal to the threshold, then the parameters stored in the memory 10 (frame size Tt and transmission period Pt) are modified (steps 118, 120).

These modifications differ according to whether or not the estimated consumed quantity of energy is less than the reference quantity of energy.

When the difference is greater than or equal to the threshold and when in addition the estimated quantity of energy is less than the reference quantity of energy, then the control unit 12 reduces the stored period and/or reduces the stored frame size, preferably both (step 118).

Preferably, the stored period is reduced in step 118 by a first factor, and the stored size is reduced by the same factor. In this text "reduce X by a factor Y" denotes an operation taking X as input and producing a result equal to X multiplied by a multiplication factor Y, Y being strictly greater than 1. Using the same factor to modify (here increase) the period Pt and the frame size Tt makes it possible to maintain the quantity of payload data transmitted by the transmitter 4 in the very long term.

For example, when the first factor is chosen equal to 2, the reductions are made as follows:

$$Pt = \frac{Pt}{2}$$

$$Tt = \frac{Tt}{2}$$

When the difference is greater than or equal to the threshold and when in addition the estimated quantity of energy is greater than the reference quantity of energy, then the control unit 12 increases the stored period and/or increases the stored frame size, preferably both (step 120).

Preferably, the stored period is increased in step 120 by a second factor, and the stored size is increased by the second factor. In this text "increase X by a factor Y" denotes an operation taking X as input and producing a result equal to X multiplied by a factor Y, Y being strictly less than 1. In other words, "increase X by a factor U" equates to "reduce X by a factor 1/Y".

For example, when the second factor is chosen equal to 2, the increases are made as follows:

$$Pt=2*Pt$$

$$Tt=2*Tt$$

Very preferably, the first factor and the second factor are equal (as in the example described above). This makes it possible to preserve a equilibrium between the different ways of modifying the two aforementioned parameters, and to avoid a long-term drift of the values of the parameters Pt, Tt. However, the two factors could be different.

Next, the control unit 12 implements the step 104 to build a new frame, of index k. As indicated previously, the control unit 12 bases itself on the value of the size Tt as present in the memory 10 to arrange for the frame of index k to have a size equal to the stored size Tt. If the frame size has been updated in step 118 or step 120, then it is this updated size that is used at this stage. Thus, it can be seen that the frame of index k can have a size equal to, greater than or less than that of the frame of index k−1, according to the decision taken by the control unit in step 114.

Next, the transmission step 106 is implemented as stated previously, such as to transmit a new radio signal carrying this new frame.

Next, the waiting step 108 is implemented, on the basis of the period Pt as stored in the memory 10, having therefore been potentially updated in step 118 or step 120. Thus, the time interval separating the respective transmissions of the radio signal of index k and a following radio signal of index k+1 will be, according to the case, equal to, greater than or less than the time interval separating the respective transmissions of the radio signal of index k−1 and of the radio signal of index k.

The inventors have found that distributing a quantity of payload data across several radio signals spaced apart in time consumes more energy than transmitting this quantity all at once in a longer radio signal threshold, on the assumption that all the other parameters used by the transmitter are identical (chosen modulation, signal power, etc.). In the example of FIG. 3, this stems from the fact that the transmitter 4 must carry out the network search phase and the reception window phase, whatever the quantity of payload data transmitted in the radio signal between these two phases. On the other hand, distributing a quantity of payload data across several spaced-apart radio signals allows the device 1 to be more responsive.

Thus, the implementation of step 120 makes it possible to arrange for the quantity of energy that will be consumed to transmit the radio signal k to be less than the quantity of energy consumed to transmit the radio signal k−1. Moreover, the implementation of step 118 makes it possible to make the device more responsive. Specifically, the device 1 does not have to wait as long in step 108 to transmit the following signal. The dynamic mode previously described is advantageous, since it allows the transmitter to strike a beneficial trade-off between responsiveness and energy consumption, and to do so in a time-varying way.

The method previously described in relation to FIG. 2 can be the subject of variants.

In particular, note that this method allows the device 1 to change operating mode (static or dynamic). It can be envisioned for the device 1 to only operate in dynamic mode.

Moreover, the first factor and the second factor can be modified, for example at the request of a remote equipment item.

The processing unit 12 can keep the parameters Pt and Tt within previously defined ranges of values. Thus, the period Pt or the size Tt can be reduced in step 118 on the condition that a minimum value is not exceeded; similarly, the period Pt or the size Tt can be increased in step 120 on the condition that a maximum value is not exceeded. By way of example, the control unit can impose a minimum period of 24 hours (in other words the sending of one frame per day) and/or a frame size which remains between 64 and 256 octets.

The invention claimed is:

1. A method implemented by a transmitter, comprising: causing a transmission of a first radio signal carrying a first payload data frame, such that: a time interval separating the transmission of the first radio signal and a transmission of a preceding radio signal by the transmitter is equal to a stored period which is stored by the transmitter, and the first payload data frame has a size equal to a stored size which is stored by the transmitter, estimating a quantity of energy consumed by the transmitter to transmit the first radio signal, comparing the quantity of energy and a reference quantity of energy, updating the stored period and the stored size on the condition that a difference between the quantity of energy and the reference quantity of energy is greater than a threshold, wherein updating the stored period and the stored size comprises: reducing the stored period by a first factor and reducing the stored size by the first factor whenever the difference is greater than the threshold and the quantity of energy is less than the reference quantity of energy, after updating, causing a transmission of a second radio signal carrying a second payload data frame, such that: a time interval separating the transmission of the second radio signal and a transmission of the first radio signal by the transmitter is equal to the stored period, and the second payload data frame has a second size equal to the stored size.

2. The method as claimed in claim 1, wherein a second factor is equal to the first factor.

3. The method as claimed in claim 1, further comprising computing the reference quantity of energy from the stored period and a remaining quantity of energy in a battery of the transmitter.

4. The method as claimed in claim 1, wherein the quantity of energy is estimated from a duration of transmission of the first signal and a transmission power of the first signal.

5. A non-transitory computer-readable medium storing a computer program product comprising program code instructions for the execution of the steps of the method as claimed in claim 1, when this program is executed by a transmitter.

6. A transmitter comprising: a radio communication interface, a control unit configured to implement the method as claimed in claim 1, such that the first radio signal and the second radio signal are transmitted by the radio communication interface.

7. A meter for measuring a consumption of fluid, the meter comprising a transmitter as claimed in claim 6, wherein the first payload data frame or the second payload data frame comprise at least a measurement of consumption of a fluid.

* * * * *